(12) United States Patent
Burger et al.

(10) Patent No.: US 7,120,039 B2
(45) Date of Patent: Oct. 10, 2006

(54) VOLTAGE CONVERTER

(75) Inventors: Roland Burger, Furth (DE); Wilhelm Appel, Laa/Thaya (AT); Peter Kremer, Herzogenaurach (DE); Ernst Plotz, Erlangen (DE)

(73) Assignee: Siemens AG Osterreich, Vienna (AT)

( * ) Notice: Subject to any disclaimer, the term of this patent is extended or adjusted under 35 U.S.C. 154(b) by 0 days.

(21) Appl. No.: 10/838,414

(22) Filed: May 4, 2004

(65) Prior Publication Data
US 2004/0245968 A1    Dec. 9, 2004

(51) Int. Cl.
*H02M 7/44* (2006.01)
(52) U.S. Cl. .......................... 363/98; 363/132
(58) Field of Classification Search .............. 363/95, 363/98, 131, 132
See application file for complete search history.

(56) References Cited

U.S. PATENT DOCUMENTS

| 5,053,938 | A | 10/1991 | Fratta |
| 6,212,085 | B1 | 4/2001 | West |
| 6,404,655 | B1 * | 6/2002 | Welches ............ 363/41 |

FOREIGN PATENT DOCUMENTS

DE    19603823 A1    8/1996

OTHER PUBLICATIONS

Written Opinion of Preliminary Searching Authority dated Aug. 21, 2003, 6 pages (Both German & English).
Response to Search Report—Oct. 30, 2003, 5 pages.
International Search Report dated May 11, 2002.

* cited by examiner

*Primary Examiner*—Gary L Laxton
(74) *Attorney, Agent, or Firm*—Anton P. Ness; Monte & McGraw, P.C.

(57) ABSTRACT

A voltage conversion circuit for the conversion of an input d.c. voltage into a three-phase a.c. voltage ($U_R$, $U_S$, $U_T$) in the mains frequency range having at least one inductor (L1, L2) and having multiple switches (S1, ..., S9) controlled by a drive circuit (AST) in which a first converter section is provided (S1, D1, L1, S2) to produce positive output voltage portions and a second converter section (S3, L2) is provided to produce negative output voltage portions and the output of the first converter section is connected to the three phase outputs (R, S, T) via one each of first longitudinal phase circuit breakers (S4, S5, S6) and the output of the second converter section via one each of second longitudinal phase circuit breakers (S7, S8, S9).

6 Claims, 3 Drawing Sheets

VOLTAGE CONVERTER

CROSS-REFERENCE TO RELATED APPLICATION

This application claims the benefit of Austrian Patent Application Serial No. A 1737/2001, filed 5 Nov. 2001 and PCT Patent Application Serial No. PCT/AT02/00308, filed 5 Nov. 2002.

FIELD OF THE INVENTION

The invention relates to a voltage conversion circuit for converting an input d.c. voltage into a three-phase a.c. voltage in the mains frequency range having at least one inductor and having multiple switches controlled by a control circuit.

BACKGROUND OF THE INVENTION

If one wants to feed power that is generated in local d.c. generators, e.g. photovoltaic generators, fuel cells, etc., into an a.c. power system of a power supply company, the d.c. voltage must be converted using a power inverter into an a.c. voltage that conforms to the grid. In this context, the power levels are in the private user range of approximately 1 to 5 kVA.

Typically, for the power range mentioned, there is only a single-phase feed into the grid, but this can lead to unintended and undesired asymmetries of the three-phase system when there is great penetration of small feeders, especially in the local district. Moreover, with single-phase feeding, an intermediate storage of the power is necessary for the inverter, because although the d.c. generator, e.g. photovoltaic generator, supplies constant power, no power may be fed into the grid around the phase zero-crossing of the a.c. current. For example, in Germany, according to the VDEW guideline "Parallel operation with the low-voltage grid", power levels above 4.6 kVA must generally be fed into the grid of the power provider in three-phase mode. A single-phase feed is not allowed.

An attempt is therefore made, even at lower power levels, to carry out a three-phase power feed. For this purpose, voltage conversions of the type specified at the outset were used, with either three single-phase inverters having been indirect-coupled or a d.c./d.c. controller and a jumper having been linked to a two-step concept. A single-step design, in any case, has the disadvantage that it may only cover a modest input voltage range but would be necessary, for example, in view of the different interconnection variants of photovoltaic modules.

A microprocessor-controlled, single-phase inverter has become known, for example, from German patent 196 42 522 C1, in which five controlled switches and one inductor are used. If these inverters are modified to produce a three-phase version, the number of switches in particular increases substantially, namely to fifteen, and three inductors are also needed.

U.S. Pat. No. 5,053,938 A describes a voltage transformer for supplying power to a three-phase motor that includes a single transformer element for producing a positive voltage. Using a bridge circuit having six switches, positive and negative voltages are then produced for the three-phase output.

U.S. Pat. No. 6,212,085 B1 describes a voltage transformer for supplying power to a consumer device in a three-phase wye connection. The transformer uses two controlled switches for each phase and assumes the presence of two voltage sources, in this case batteries, as well as an inductor in the load branch, that is, a motor or a transformer as a load. The circuit also allows no uninterrupted ground connection between input and output, that is, a continuous PEN conductor. The use of this known transformer must therefore remain limited.

An object of the invention is to create an inverter that transforms a d.c. voltage, which is supplied by, for example, solar power systems, fuel cells, batteries, d.c. machines, etc., into a three-phase a.c. current to feed into three-phase grid. In so doing, the use of controlled switches and inductors should be kept to a minimum; nevertheless, a great input voltage range should be covered, whereby the input voltage may be not only smaller than the output a.c. voltage, but also greater.

This objective is achieved, starting from a voltage conversion circuit of the type specified at the outset, by a first converter section being provided to produce positive output voltage portions and a second converter section being provided to produce negative output voltage portions, and the output of the first converter section being connected to the three-phase outputs via one each of first longitudinal phase circuit breakers and the output of the second converter section via one each of second longitudinal phase circuit breakers.

The invention provides a voltage transformer that does not just satisfactorily achieve the objective or objectives in question, but also offers the possibility of enabling a continuous ground connection between the negative (or positive) pole of the input d.c. voltage and the PEN conductor of the three-phase grid, whereupon no stray currents to ground and no mains frequency (50 Hz) fields are output by the d.c. power source, e.g. the photovoltaic generator.

An advantageous variant of an embodiment of the invention is characterized in that a pole of the d.c. voltage is direct-connected to the PEN conductor of the three-phase output, the series connection of a first transverse switch and a transverse inductor is between one pole of the d.c. current and ground, the junction point of this series connection is connected via one each of the second longitudinal phase circuit breakers to the three-phase outputs, the one pole of the d.c. voltage is also conducted via a longitudinal circuit breaker and, in series therewith, a longitudinal inductor via one each of the first longitudinal phase circuit breakers to the three-phase outputs and via a second transverse switch to ground, and the junction point of the series connection of the longitudinal circuit breaker with the longitudinal inductor is connected to ground via a diode situated in the blocking direction in relation to the input voltage, the longitudinal inductor together with the longitudinal circuit breaker and the second transverse switch and one of the first longitudinal circuit breakers as well as the diode as a step-up/step-down converter forming the first converter section, and the transverse inductor together with the first transverse switch and one of the second longitudinal circuit breakers as a negative phase-sequence converter forming the second converter section. In this variant, a continuous PEN conductor is realized and the number of controlled switches is only nine.

An easily realized microprocessor-based variant provides that the drive circuit has:

an input watchdog that is set up at least to monitor input voltage and/or input current, a grid watchdog that is set up to monitor voltage and/or current and/or phase angle of the three-phase a.c. voltage, a hierarchical system manager to which the output signals of the input watchdog and the grid watchdog are fed and which is set up to determine setpoint values pertaining to the voltage values to be generated, a converter drive to which setpoints for the creation of positive and negative output voltages are fed by the system manager in order to drive the switches of the first and second converter sections, and a phase drive to which setpoints are supplied by the system manager to switch the first and second longitudinal phase circuit breakers in order to drive these longitudinal circuit breakers.

It may also be expedient if the output of the first converter section is conducted via a first longitudinal diode in the conducting direction to the first longitudinal phase circuit breakers and/or the output of the second voltage converter section is conducted via a second longitudinal diode in the blocking direction to the second longitudinal phase circuit breakers. The advantage of this design is that in this case the requirements imposed on the hierarchical system manager are less complex.

BRIEF DESCRIPTION OF THE DRAWINGS

The invention, together with additional advantages, is explained in detail below in reference to exemplary embodiments that are illustrated in the drawing. In the drawing.

DETAILED DESCRIPTION OF THE INVENTION

Figure 1:
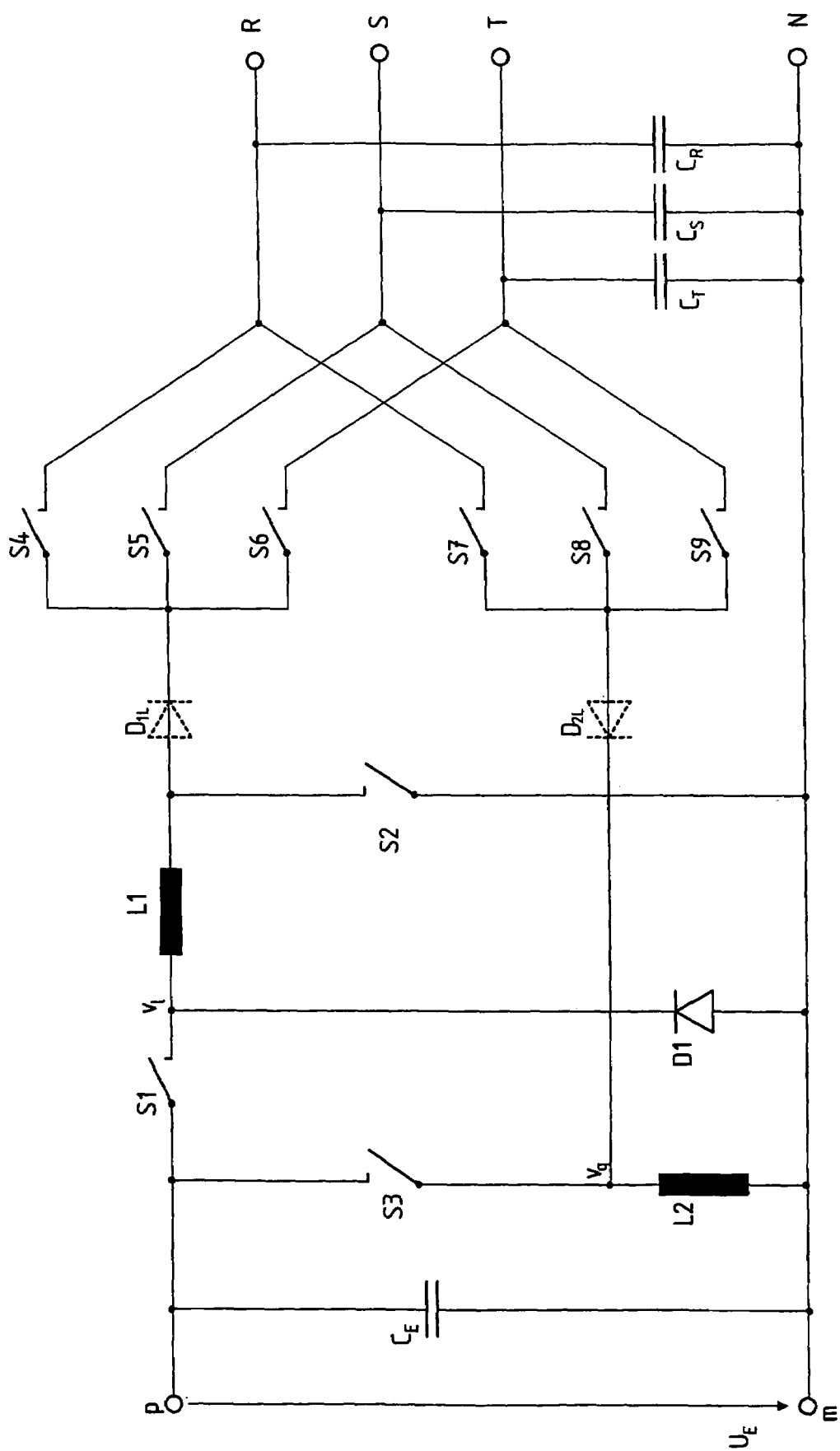
FIG. 1 shows a diagram of a voltage conversion circuit of the present invention, omitting the drive circuit and details known to one skilled in the art that do not pertain to the invention.

According to FIG. 1, an input d.c. voltage that comes from a photovoltaic generator (not shown) or another d.c. voltage source is present for the voltage conversion circuit according to the present invention. This voltage is applied with its first or non-ground pole at an input pole p of the voltage conversion circuit and with its second or ground pole at a ground input pole m. An input capacitor $C_E$ smoothes out surges and serves to suppress interference, it being also possible to provide other known interference suppression measures (not shown), such as interference suppression coils, on both the input side and the output side.

Between input pole p and ground m is the first series connection of a first controlled transverse switch S3 and a transverse inductor L2, the junction point $v_g$ of this first series connection being conducted to three second longitudinal phase circuit breakers S7, S8, S9 and it being possible to connect it via one each of these switches to one of outputs R, S, T of the three-phase system. In some cases—this is indicated by broken lines—a second longitudinal diode $D_{2L}$ may be connected in the line from the junction point $v_g$ to second longitudinal phase circuit breakers S7, S8, S9 to prevent the current from positive pole p from flowing directly to one of phases R, S or T if, due to technically required switching times of the semiconductor switch used, it turns out that both S3 and one of switches S7, S8, S9 are enabled. A monitoring to the effect that switch S2 can never be closed if one of switches S4, S5 or S6 is closed or switch S3 is not simultaneously closed together with one of switches S7, S8 or S9 may be omitted and the hierarchical system manager becomes less complex. However, additional component costs and a loss in the efficiency of the inverter are produced by the insertion of diodes $D_{1L}$ and $D_{2L}$.

Pole p—non-ground in this exemplary embodiment—of input voltage $U_E$ is also connected in a second series connection via a longitudinal circuit breaker S1 and in series therewith a longitudinal inductor L1 via one each of first longitudinal phase circuit breakers S4, S5, S6 to three-phase outputs R, S, T, it being possible also in this case to connect a first longitudinal diode $D_{1L}$ in order to prevent current from being able to flow from one of phases R, S or T to ground pole m of the input, if it turns out that, due to technically required switching times or semiconductor switches used, both S2 and one of switches S4, S5, S6 are enabled.

Junction point $v_1$ of longitudinal circuit breaker S1 and longitudinal inductor L1 is connected to ground m via a diode D1 that is situated in the blocking direction in relation to input voltage $U_E$.

Input ground pole m is looped through up to output PEN conductor N of the three-phase output, and smoothing and interference suppression capacitors $C_T$, $C_S$, $C_R$ are connected between outputs R, S, T and PEN conductor N.

Actually, according to its function, the voltage conversion circuit of the present invention is comprised of two conversion circuits.

The first conversion circuit has a first converter section comprising longitudinal circuit breaker S1, longitudinal inductor L1, diode D1 and second transverse switch S2, which, together with first longitudinal phase circuit breakers S4, S5, S6 or alternatively diode $D_{1L}$, complete the first conversion circuit, which serves as a step-up/step-down converter for the creation of positive output voltage portions.

The second conversion circuit is formed from a second converting element, namely transverse switch S3 and transverse inductor L2, and second longitudinal switches S7, S8, S9 or, alternatively, diode $D_{2L}$. The second conversion circuit serves as a negative phase-sequence converter for the creation of negative output voltage portions.

Figure 2:
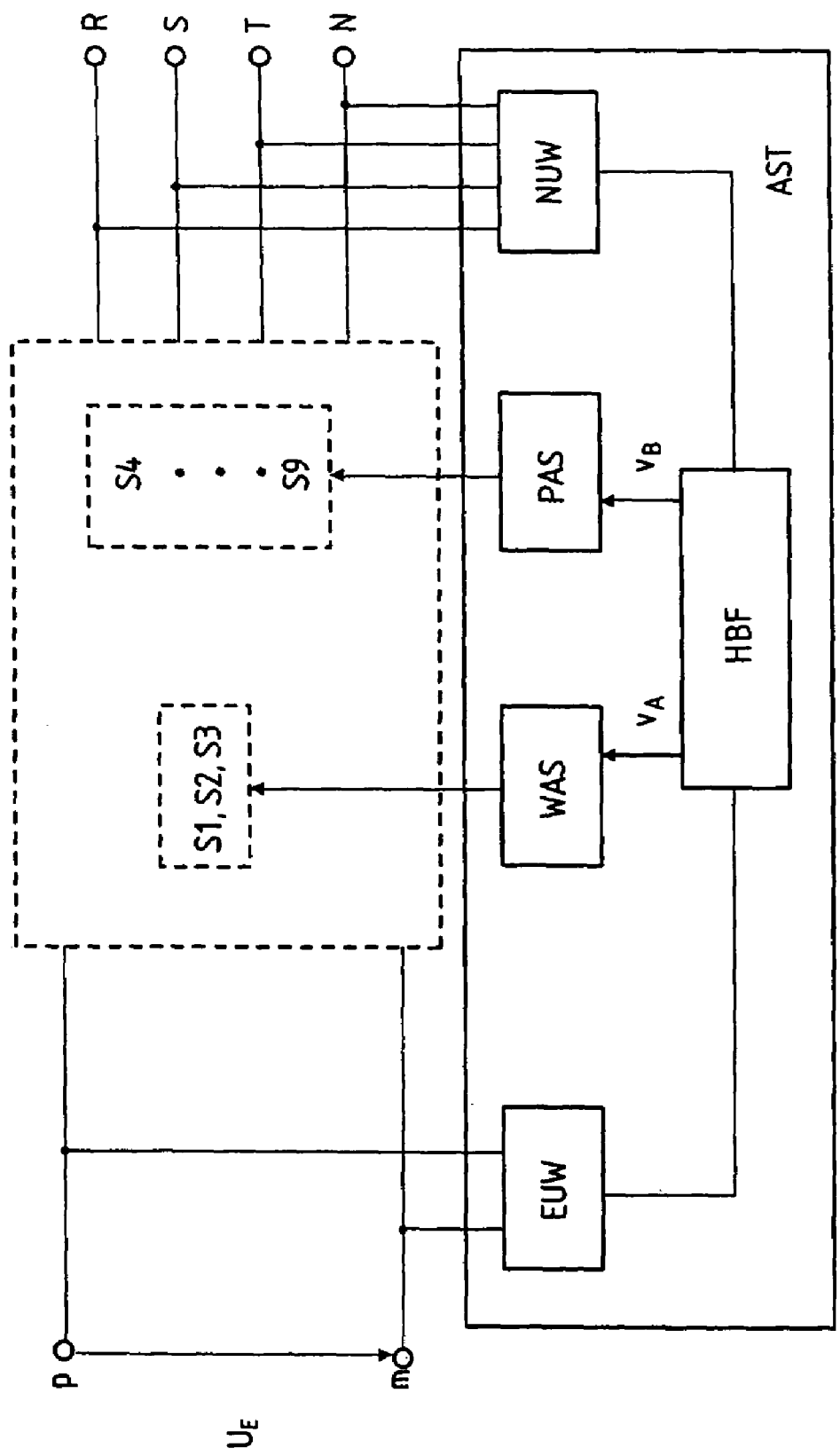
FIG. 2 shows a drive circuit for the voltage conversion circuit according to FIG. 1.
Figure 3:
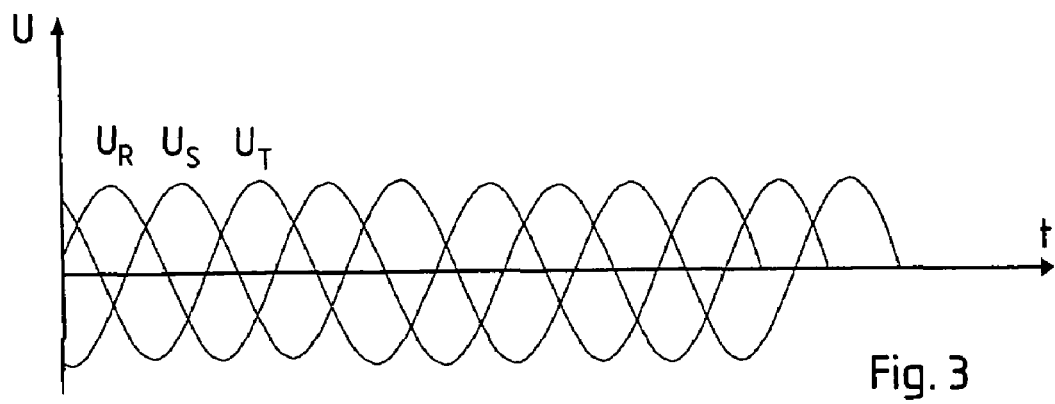
FIG. 3 shows the curve over time of a three-phase a.c. voltage for feeding into an a.c. grid.

The principal structure of a drive circuit AST for the nine controlled switches S1 . . . S9 is shown by FIG. 2. Input and output data gained from an input watchdog EUW and from a mains watchdog NUW, and conditioned if need be, are fed to a hierarchical system manager HBF. Input watchdog EUW determines in particular how much power a generator connected in series produces, or can produce at a particular moment, the voltage level, etc. The output watchdog determines, for example, the level of the interlinked voltages, the momentary phase angle, etc.

From the output signals of input watchdog EUW and grid watchdog NUW, hierarchical system manager HBF then determines first and second setpoint or default values $V_A$, $V_B$ for a converter drive circuit WAS and for a phase drive circuit PAS.

Converter drive circuit WAS approaches the task of driving switches S1, S2 and S3 for the creation of positive and negative output voltage portions with the help of default value $v_M$. In this case, sinusoidal segments are calculated or produced according to the principle of a pulse width modulation, the corresponding switches being switched on or off at a high frequency, e.g. 50 kHz compared to the mains frequency (see explanations further below for FIG. 5).

Phase drive PAS calculates the values for the switching of the positive and negative voltages previously produced in both first and second converter sections taking into consideration setpoint values $v_g$ which were received by system manager HBF. In so doing first and second longitudinal phase circuit breakers S4, S5, S6 and S7, S8, S9 are reconnected at the switching frequency that is high compared to the mains frequency. Depending on the momentary phase constellation, in this context some switches remain enabled. If, for example, only one phase is "supplied" during a specific period, then the corresponding switch of switches S4 to S6 or S7 to S9 simply completes the circuit. Should two phases be supplied, then there is switching between the two accompanying switches in the manner of the pulse width modulation using the high switching frequency, and the voltage previously generated in the first or second converter section is distributed accordingly.

Figure 4:
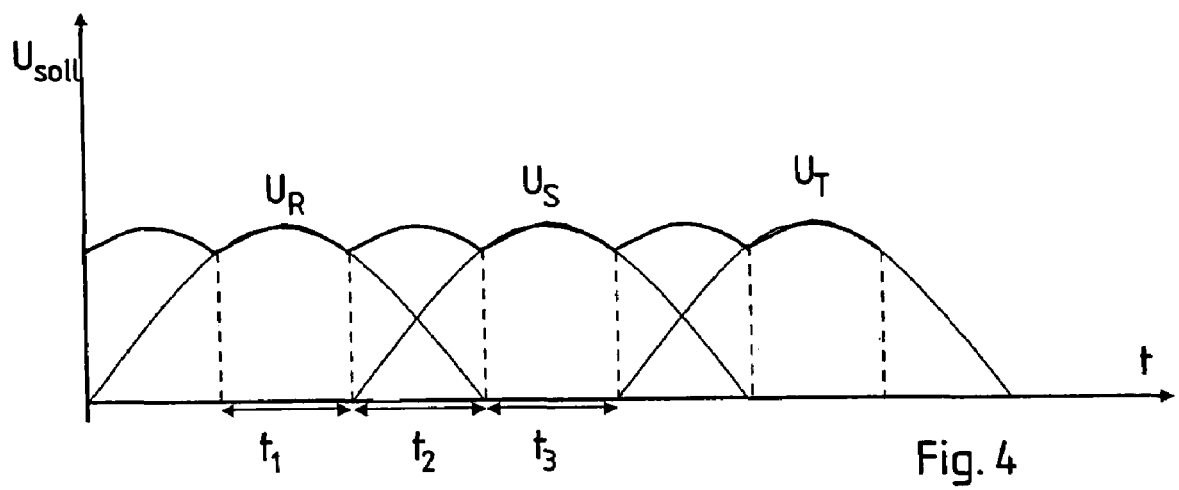
FIG. 4 shows the positive voltage portion and in boldface the setpoint value of the output voltage of the step-up/step-down converter in another time and amplitude scale.

FIG. 4 shows as an example the distribution of the positive voltage portions on phases R, S, T. Reference voltage $U_{soll}$ is shown in boldface. During a period $t_1$, a positive voltage is applied to the output of longitudinal inductor L1. This is switched via switch S4 directly to phase R. If no diode $D_{1L}$ is inserted, one must make sure that switch S4 can only be closed if S2 is opened. Using longitudinal diode $D_{1L}$, S4 may be closed for the entire period $t_1$. During the subsequent period $t_3$, the positive voltage at the output of transverse inductor L1 is switched completely to S according to the above pattern. Analogously, the same applies for the distribution of the negative voltage portions.

Figure 5:
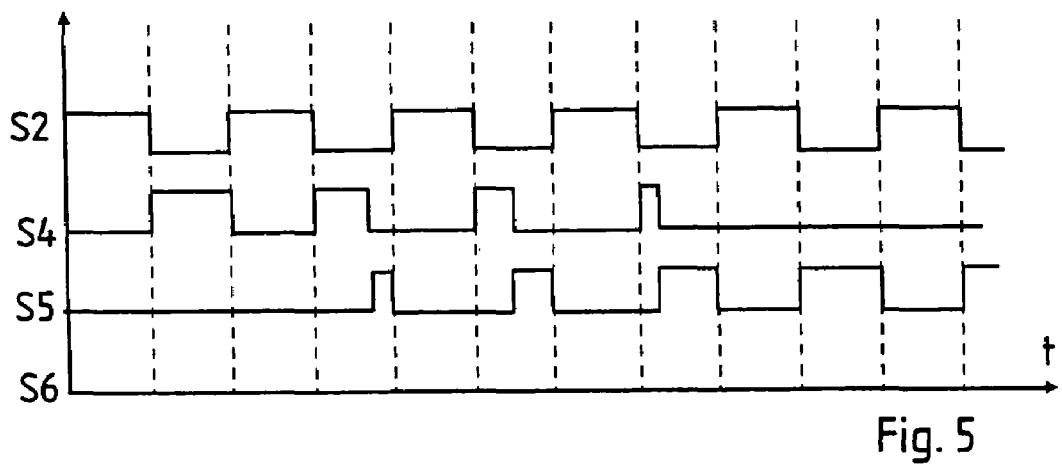
FIG. 5 shows the closing and opening of specific controlled switches in a transition of phase R of the output voltage to phase S.

FIG. 5 indicates the example of the transition from phase R to phase S, period $t_2$ in FIG. 4, the "play" of switches S2, S4, S5 and S6 under the assumption that input voltage UE is smaller than output voltage UR, US, UT and, thus, transverse switch S1 is constantly closed.

Transverse switch S2 of first converter section S1, D1, L1, S2 opens and closes in this case at an arbitrarily selected pulse duty factor of 1:2 at the high switching frequency. The pulse duty factor of switch S4, which goes with phase R (see FIG. 1), is still approximately 1:1 at the beginning of the period in question, and then drops down to zero in the manner of a dropping sine, whereas the pulse duty factor of switch S5, which does with phase S, in first zero and then in the manner of a climbing sine goes in the opposite direction at, for example, 2:1.

Switch S6, which belongs with phase T, is always open during the transition period in question.

Because both the positive and negative voltage portions of the three interlinked a.c. voltages UR, US, UT are formed according to the same method, only the positive voltage was considered above. The voltage conversion circuit (step-up/step-down converter or inverting converter) according to the present invention thus continually applies voltage to either one or two phases of the output, it being true that the sum of the voltages across two phases corresponds in level to the time-related curve of the voltage across the individual phases. Thus, the voltage conversion circuit's output voltage $U_{soll}$ to be controlled is represented as a stringing together of six sine portions (from 60° to 120°) per 50 Hz phase. The reference value of the output voltage for the control of the voltage conversion circuit thus moves within a narrow band of ±8%. If voltage is applied to only one phase, then the corresponding switch, for example S4, is activated for the phase R in push-pull mode with switch S1 or S2, depending on whether the input voltage is to be set high or low. In the example of stepping up, this was explained using FIG. 5. There, one also sees that, in the supplying of two phases, the closing time is divided proportional to the level of the setpoint voltage between the two switches assigned to the phases of the three longitudinal phase circuit breakers S4, S5, S6.

As already mentioned, the two converter sections are able to generate both a higher and a lower voltage than is present at the input, so it is possible to cover a great input voltage range. The voltage conversion circuit may be completely isolated from the d.c. voltage input, e.g. photovoltaic generator, by longitudinal circuit breaker S1 and transverse switch S3 if this is required ("d.c. current disconnection"). Moreover, the six longitudinal phase circuit breakers S4 . . . S9, together with mains relays (not shown) may be used to isolate the inverter in several stages from the mains if specifications or standards so require.

The invention claimed is:

1. A voltage conversion circuit for conversion of an input d.c. voltage ($U_E$) into a three-phase a.c. current (UR, US, UT) in a mains frequency range having at least one inductor (L1, L2) and several switches (S1, . . . , S9) controlled by a drive circuit (AST), comprising:
   a first converter section for producing positive output voltage portions and a second converter section for producing negative output voltage portions, and
   output of the first converter section via one of a plurality of first longitudinal phase circuit breakers (S4, S5, S6) and output of the second converter section via one of a plurality of second longitudinal phase circuit breakers (S7, S8, S9) are connected to produce three-phase current outputs (R, S, T), wherein:
   a ground pole (m) of the d.c. voltage ($U_E$) is directly connected to a PEN conductor (N) of the three-phase outputs,
   a first series connection of a first transverse switch (S3) and a transverse inductor (L2) is between a non-ground pole (p) of the d.c. voltage and ground,
   a junction point of the first series connection (S3, L2) is connected via one of the second longitudinal phase circuit breakers (S7, S8, S9) to the three-phase outputs (R, S, T),
   the non-ground pole (p) of the d.c. voltage is also connected in a second series connection via a longitudinal circuit breaker (S1) and in series with it a longitudinal inductor (L1) via one of the first longitudinal phase circuit breakers (S4, S5, S6) so the three-phase outputs (R, S, T) and via a second transverse switch (S2) to ground, and a junction point of the second series connection of the longitudinal circuit breaker (S1) with the longitudinal inductor (L1) is connected to ground via a diode (D1) that is in the blocking direction in relation to the input voltage,
   the longitudinal inductor (L1) together with the longitudinal circuit breaker (S1) and the second transverse switch (S2) and one of the first longitudinal phase circuit breakers (S4, S5, S6) and diode (D1) defining a step-up/step-down converter forming the first converter section (S1, D1, L1, S2), and the second transverse inductor (L2) together with the first transverse switch (S3) and one of the second longitudinal phase circuit breakers (S7, S8, S9) defining an inverting converter forming the second converter section (S3, L2).

2. A voltage conversion circuit for conversion of an input d.c. voltage ($U_E$) into a three-phase a.c. current (UR, US, UT) in a mains frequency range having at least one inductor (L1, L2) and several switches (S1, ..., S9) controlled by a drive circuit (AST), comprising:
- a first converter section for producing positive output voltage portions and a second converter section for producing negative output voltage portions, and
- output of the first converter section via one of a plurality of first longitudinal phase circuit breakers (S4, S5, S6) and output of the second converter section via one of a plurality of second longitudinal phase circuit breakers (S7, S8, S9) are connected to produce three-phase current outputs (R, S, T), wherein the drive circuit (AST) has:
- an input watchdog (EUW) that is set up to monitor at least input voltage ($U_E$) and/or input current,
- a mains watchdog (NUW) that is set up to monitor voltage and/or current and/or phase angle of the three-phase a.c. current,
- a hierarchical system manager (HBF) to which output signals of the input watchdog and the mains watchdog are fed for determining first and second setpoint values ($v_a$, $v_b$) pertaining to voltage values to be produced,
- a drive circuit (WAS) into which first setpoint values ($v_a$) for producing the positive and negative output voltage portions are fed by the system manager (HBF) in order to drive the switches (S1, S2, S3) of the first and second converter sections, and
- a phase drive circuit (PAS) into which second setpoint values ($v_b$) for switching of the first and second longitudinal phase circuit breakers (S4, ..., S9) are fed in order to drive the first and second longitudinal phase circuit breakers.

3. A voltage conversion circuit as described in one of claims 1 or 2, wherein the output of the first converter section is conducted via a first longitudinal diode ($D_{1L}$) in a conducting direction to the first longitudinal phase circuit breakers (S4, S5, S6).

4. A voltage conversion circuit as described in one of claims 1 or 2, wherein the output of the second voltage converter section is conducted via a second longitudinal diode ($D_{2L}$) in a blocking direction to the second longitudinal phase circuit breakers (S7, S8, S9).

5. A voltage conversion circuit as described in claim 1, wherein the output of the first converter section is conducted via a first longitudinal diode ($D_{1L}$) in a conducting direction to the first longitudinal phase circuit breakers (S4, S5, S6), and wherein the output of the second voltage converter section is conducted via a second longitudinal diode ($D_{2L}$) in a blocking direction to the second longitudinal phase circuit breakers (S7, S8, S9).

6. A voltage conversion circuit as described in claim 2, wherein the output of the first converter section is conducted via a first longitudinal diode ($D_{1L}$) in a conducting direction to the first longitudinal phase circuit breakers (S4, S5, S6), and wherein the output of the second voltage converter section is conducted via a second longitudinal diode ($D_{2L}$) in a blocking direction to the second longitudinal phase circuit breakers (S7, S8, S9).

* * * * *

UNITED STATES PATENT AND TRADEMARK OFFICE
CERTIFICATE OF CORRECTION

| | |
|---|---|
| PATENT NO. | : 7,120,039 B2 |
| APPLICATION NO. | : 10/838414 |
| DATED | : October 10, 2006 |
| INVENTOR(S) | : Roland Burger et al. |

Page 1 of 1

It is certified that error appears in the above-identified patent and that said Letters Patent is hereby corrected as shown below:

Please enter on Title page of patent:

Insert

(63)   Related U.S. Application Data
       Continuation of application No. PCT/AT02/00308 filed on November 5, 2002.

(30)   Foreign Application Data
       November 5, 2001  (AT)        A 1737/2001

Signed and Sealed this

First Day of May, 2007

JON W. DUDAS
*Director of the United States Patent and Trademark Office*